United States Patent Office.

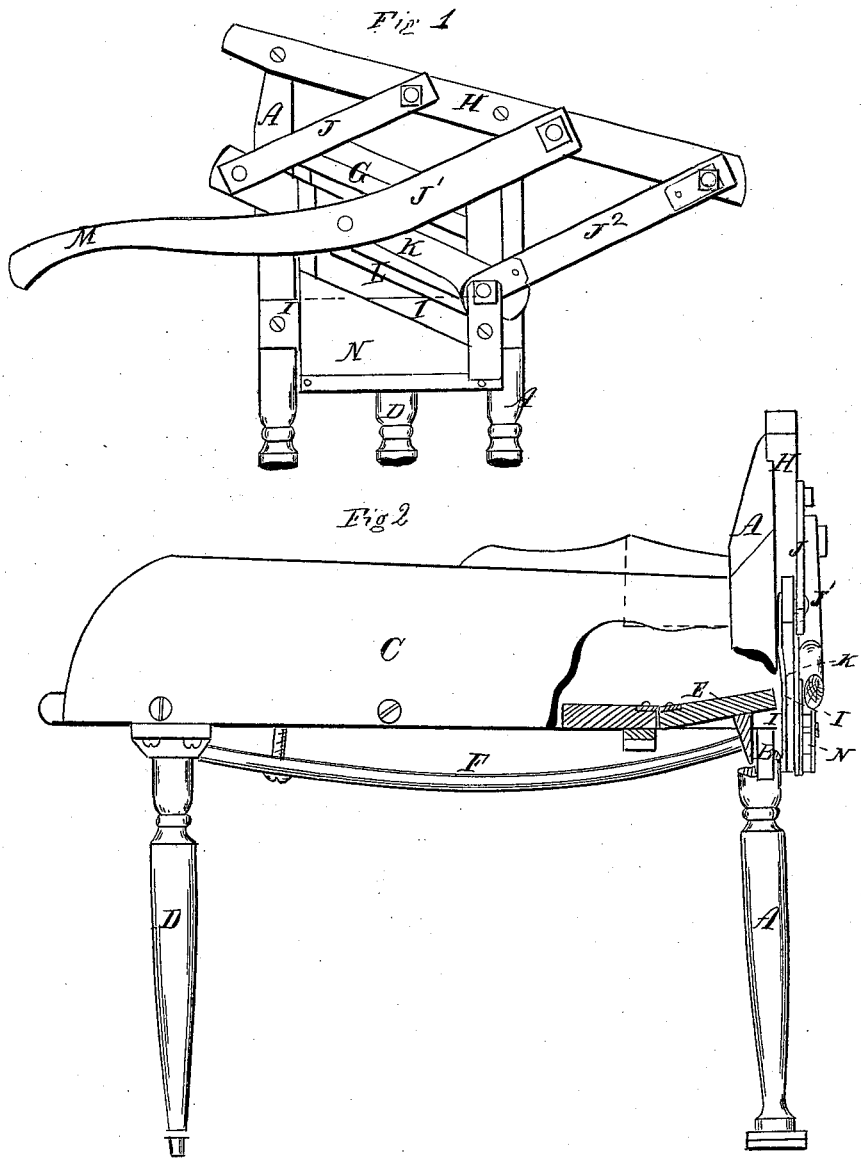

DANFORD CHAFFEE, OF ROME, PENNSYLVANIA.

Letters Patent No. 92,583, dated July 13, 1869.

IMPROVEMENT IN STRAW-CUTTERS.

The Schedule referred to in these Letters Patent and making part of the same.

*To all whom it may concern:*

Be it known that I, DANFORD CHAFFEE, of Rome, in the county of Bradford, and in the State of Pennsylvania, have invented certain new and useful Improvements in Straw-Cutters; and do hereby declare that the following is a full, clear, and exact description thereof, reference being had to the accompanying drawings, and to the letters of reference marked thereon, making a part of this specification.

The nature of my invention consists in the construction and general arrangement of a "straw-cutter," but more particularly in the device for or manner of operating the cutting-knife.

In order to enable others skilled in the art to which my invention appertains to make and use the same, I will now proceed to describe its construction and operation, referring to the annexed drawings, in which—

Figure 1 is a front view, and
Figure 2, a side elevation, part in section.

A A represent two standards, connected at a suitable height by a cross-piece, B, on which the front end of the box C rests, the rear end of said box being supported by one or two legs D.

Like other straw-cutters, the box C is open at both ends, and contracting toward the front. The front end of the bottom is hinged, as seen in fig. 2, and this hinged portion E is held or pressed slightly upward, by means of a spring, F, placed underneath the box, so as to hold the straw up to the knives, at the same time yielding enough to allow the knives or cutters to cut the straw easily.

To the front side of the standards A A is secured a horizontal knife, I, edge uppermost, which edge extends up above the level of the bottom of the box C. This knife may, however, be dispensed with, and a bent steel bar placed at the mouth of the box C, against the outer edge of which bar the upper or movable cutting-knife would operate.

Within the mouth of the box C is placed an inclined board, G, forming a roof, so as to hold the straw down, and allow the cutting-knife to be raised above all the straw.

Dovetailed to the upper ends of the standards A A is a bar, H, placed in an inclined position, as shown in fig. 1, one end of said bar extending a suitable distance beyond the side of the box C. This bar is, by three levers, J, $J^1$, and $J^2$, connected with an inclined bar, K, to the inner side of which latter bar the cutting-knife L is secured, thus working the cutting-knife by something similar to the Archimedes broken lever, and giving to the cutting-knife a drawing as well as cutting stroke.

Although the material of which the levers J, $J^1$, and $J^2$ are made may be considered unimportant, I have found it best to make the shortest one, J, (the three levers being of unequal length,) of metal.

The middle lever $J^1$ is extended below and beyond the cutting-knife L, so as to form the handle M, with which the machine is operated.

From the bar K is suspended a guide, N, which regulates the distance the straw will extend beyond the knives to be cut.

A machine thus constructed may be used for cutting hay, corn-stalks, &c., as well as for straw.

Having thus fully described my invention,
What I claim as new, and desire to secure by Letters Patent, is—

1. The combination of the bar H, levers J $J^1$ $J^2$, and bar K, carrying the cutting-knife L, all constructed as described, and for the purposes set forth.

2. The combination and arrangement of the standards A A, box C, hinged part E of bottom, spring F, inclined roof G, inclined bar H, connecting levers J, $J^1$, and $J^2$, cutting-knife L, guide N, and with or without the stationary knife L, all constructed and operating substantially as and for the purposes herein set forth.

In testimony that I claim the foregoing, I have hereunto set my hand, this 29th day of May, 1869.

DANFORD CHAFFEE.

Witnesses:
STEPHEN ELWELL,
ADDISON W. TAYLOR.